United States Patent
Kawagishi et al.

(10) Patent No.: US 8,208,703 B2
(45) Date of Patent: Jun. 26, 2012

(54) MEDICAL IMAGE ANALYSIS APPARATUS AND IMAGE ANALYSIS CONTROL PROGRAM

(75) Inventors: Tetsuya Kawagishi, Nasushiobara (JP); Hiroyuki Ohuchi, Otawara (JP); Yasuhiko Abe, Otawara (JP); Thomas Helle-Valle, Baltimore, MD (US); Joao A. C. Lima, Baltimore, MD (US)

(73) Assignees: Toshiba Medical Systems Corporation, Otawara-shi (JP); The Johns Hopkins University, Baltimore, MD (US)

( * ) Notice: Subject to any disclaimer, the term of this patent is extended or adjusted under 35 U.S.C. 154(b) by 715 days.

(21) Appl. No.: 12/265,302

(22) Filed: Nov. 5, 2008

(65) Prior Publication Data

US 2010/0111380 A1 May 6, 2010

(51) Int. Cl.
*G06K 9/00* (2006.01)
(52) U.S. Cl. ..................................... 382/128
(58) Field of Classification Search .................. None
See application file for complete search history.

(56) References Cited

U.S. PATENT DOCUMENTS

| 7,106,189 B2 * | 9/2006 | Burneske et al. | 340/539.13 |
| 2006/0036172 A1 * | 2/2006 | Abe | 600/443 |
| 2008/0181472 A1 * | 7/2008 | Doi et al. | 382/128 |
| 2009/0198133 A1 * | 8/2009 | Kawagishi et al. | 382/131 |

FOREIGN PATENT DOCUMENTS

JP 2005-130877 5/2005

* cited by examiner

*Primary Examiner* — Jermele M Hollington
(74) *Attorney, Agent, or Firm* — Oblon, Spivak, McClelland, Maier & Neustadt, L.L.P.

(57) ABSTRACT

A motion function of a biological tissue is efficiently evaluated on the basis of image data collected from different medical image diagnostic apparatuses. In terms of a common analysis algorithm applied to subject's time-series image data supplied from a separate medical image diagnostic apparatus, a setting part sets a plurality of interest points on a myocardial tissue of a reference image data extracted from the image data, and a tracking process part measures a motion parameter on the basis of displacement information of the myocardial tissue at the interest points obtained by a tracking process between the reference image data and subsequent image data thereof. Meanwhile, a data creating unit creates parameter image data showing two-dimension distribution of the motion parameter or parameter time-series data showing a variation in time of the motion parameter as parameter data on the basis of the measurement result, and displays the parameter data.

12 Claims, 7 Drawing Sheets

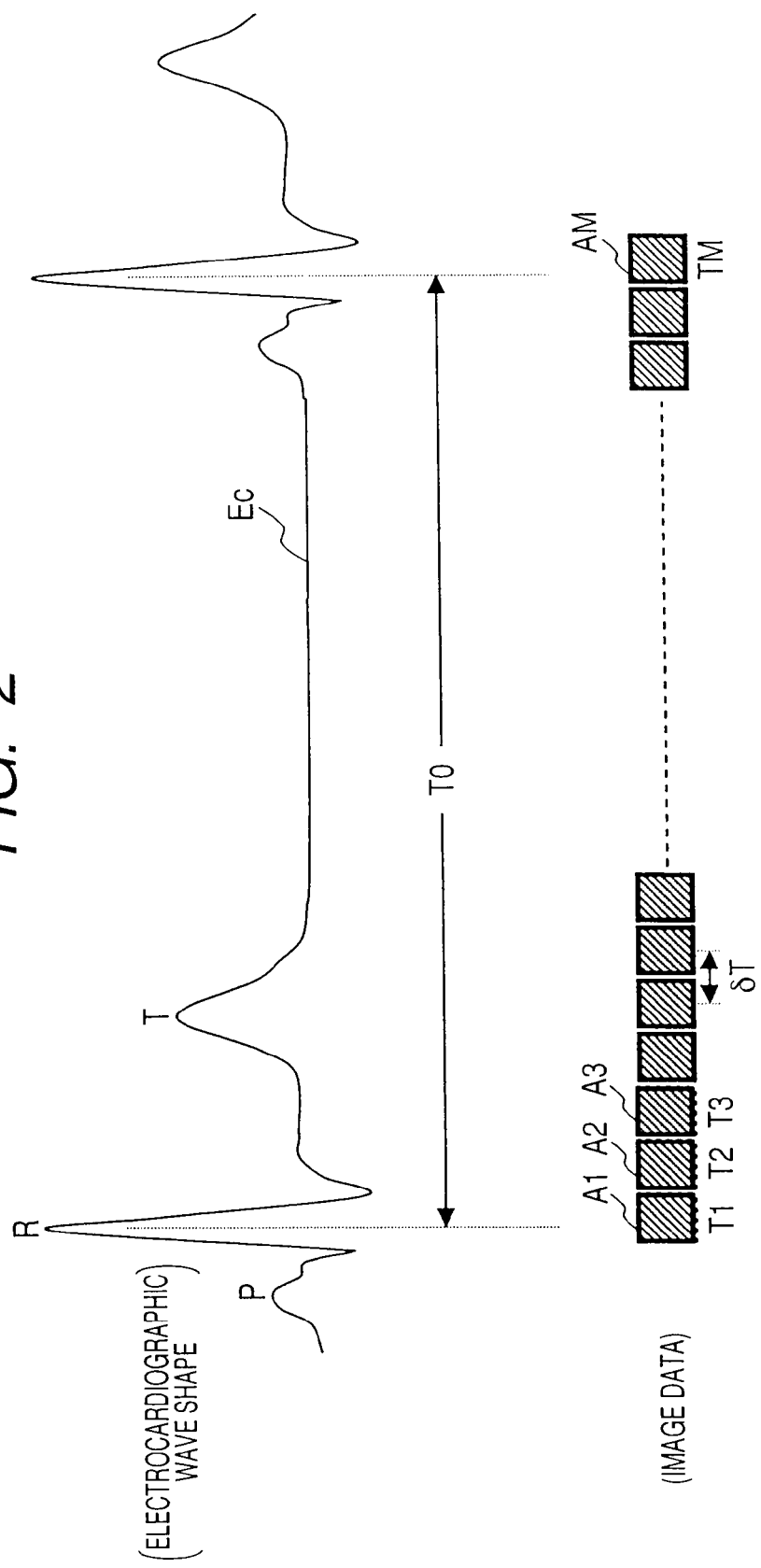

MEDICAL IMAGE ANALYSIS APPARATUS AND IMAGE ANALYSIS CONTROL PROGRAM

BACKGROUND OF THE INVENTION

1. Field of the Invention

The present invention relates a medical image analysis apparatus and an image analysis control program, and more particularly to, a medical image analysis apparatus and an image analysis control program for creating parameter image data or the like on the basis of a motion parameter of a biological tissue obtained by analyzing time-series image data collected from a subject.

2. Description of the Related Art

Nowadays, a medical image diagnosis has been rapidly advanced due to the development of an X-ray CT apparatus, an MRI apparatus, an ultrasonic diagnostic apparatus, or the like put to practical use with the advance in computer technology. Accordingly, the medical image diagnosis is necessarily used in the recent medical treatment. Particularly, the X-ray CT apparatus or the MRI apparatus is capable of displaying the image data in real-time with an increase in speed and performance of a calculation processing device or a biological information detecting device. Also, the ultrasonic diagnostic apparatus is capable of easily observing two-dimension image data in real-time just by simply contacting an ultrasonic probe on a body surface. For this reason, the X-ray CT apparatus, the MRI apparatus, and the ultrasonic diagnostic apparatus are widely used for a shape diagnosis or a function diagnosis of biological internal organs.

Particularly, in the recent ultrasonic diagnostic field, a strain imaging method is developed which carries out, for example, a two-dimension observation of "strain" on the basis of displacement information of a myocardial tissue obtained by analyzing ultrasonic image data such as B-mode image data collected in time series.

In the strain imaging method of carrying out a heart function diagnosis, B-mode image data is collected in time series on the basis of a received signal obtained by an ultrasonic wave scanning on a subject, and "displacement" of the respective portions of a myocardial tissue is measured by applying a tracking process using a pattern matching with respect to ultrasonic image data adjacent to each other in time direction. Then, strain image data is created by calculating two-dimension distribution of "strain" defined as displacement by unit length.

Additionally, a method is proposed in which two-dimension distribution of "a strain speed" is measured on the basis of an inclination in space of a movement speed obtained by a TDI (Tissue Doppler Imaging) method of displaying a movement speed of a myocardial tissue in two dimension by the use of a color Doppler method, and strain image data is created by integrating "the strain speed" in time (for example, see Japanese Patent Application Laid-Open No. 2005-130877).

Meanwhile, the strain imaging method using the X-ray CT apparatus or the MRI apparatus capable of collecting the time-series image data in a short time has been examined. Particularly, it is difficult to obtain strain image data of the four-chamber section or two-chamber section by the use of the ultrasonic diagnostic apparatus because a propagation of the ultrasonic wave is disturbed by a rib or a lung, but according to the strain imaging method using the X-ray CT apparatus or the MRI apparatus, it is possible to easily create strain image data of the four-chamber section or two-chamber section.

That is, it is possible to create the strain image data suitable for a diagnosis by selecting the medical image diagnostic apparatus used in the strain imaging method in accordance with a diagnosis object and a diagnosis portion. Also, it is possible to obtain high precision by comparing and observing various strain image data created on the basis of the image data obtained from a plurality of different medical image diagnostic apparatuses.

However, in a case where the strain image data is created by analyzing the image data collected from the plurality of different medical image diagnostic apparatuses as described above, it is difficult to efficiently create the strain image data and to compare and observe the various strain image data with high precision because an analysis apparatus or an analysis algorithm is different depending on the type of the medical image diagnostic apparatus conventionally.

BRIEF SUMMARY OF THE INVENTION

The present invention is contrived in consideration of the above-described problems, and an object of the invention is to provide a medical image analysis apparatus and an image analysis control program capable of efficiently evaluating a motion function of a biological tissue using a motion parameter such as "strain" measured by applying a common analysis algorithm to time-series image data of the biological tissue created by each of different medical image diagnostic apparatuses.

In order to achieve the above-described object, according to an aspect of the invention, there is provided a medical image analysis apparatus including: an image data collecting unit configured to collect time-series image data created by each of different medical image diagnostic apparatuses; a motion parameter measuring unit configured to measure a motion parameter of a biological tissue by processing the time-series image data; a parameter data creating unit configured to create parameter data on the basis of the motion parameter; and a display unit configured to display the parameter data, wherein the motion parameter measuring unit measures the motion parameter by analyzing the image data collected from each of the medical image diagnostic apparatuses by the use of a common analysis algorithm.

According to another aspect of the invention, there is provided an image analysis control program for allowing a medical image analysis apparatus to execute the functions of: collecting time-series image data created by each of different medical image diagnostic apparatuses; measuring a motion parameter of a biological tissue by processing the time-series image data; creating parameter data on the basis of the motion parameter; and displaying the parameter data.

According to the invention, since the desired motion parameter is measured by applying a predetermined common analysis algorithm to the time-series image data of the biological tissue created by the different medical image diagnostic apparatuses, it is possible to efficiently evaluate the motion function of the biological tissue. For this reason, it is possible to improve diagnostic efficiency and diagnostic precision and to reduce a burden of the operator.

BRIEF DESCRIPTION OF THE SEVERAL VIEWS OF THE DRAWING

FIG. 2 is a diagram illustrating time-series image data for one cardiac cycle collected by a medical image diagnostic apparatus according to the embodiment.

DETAILED DESCRIPTION OF THE INVENTION

Figure 1:
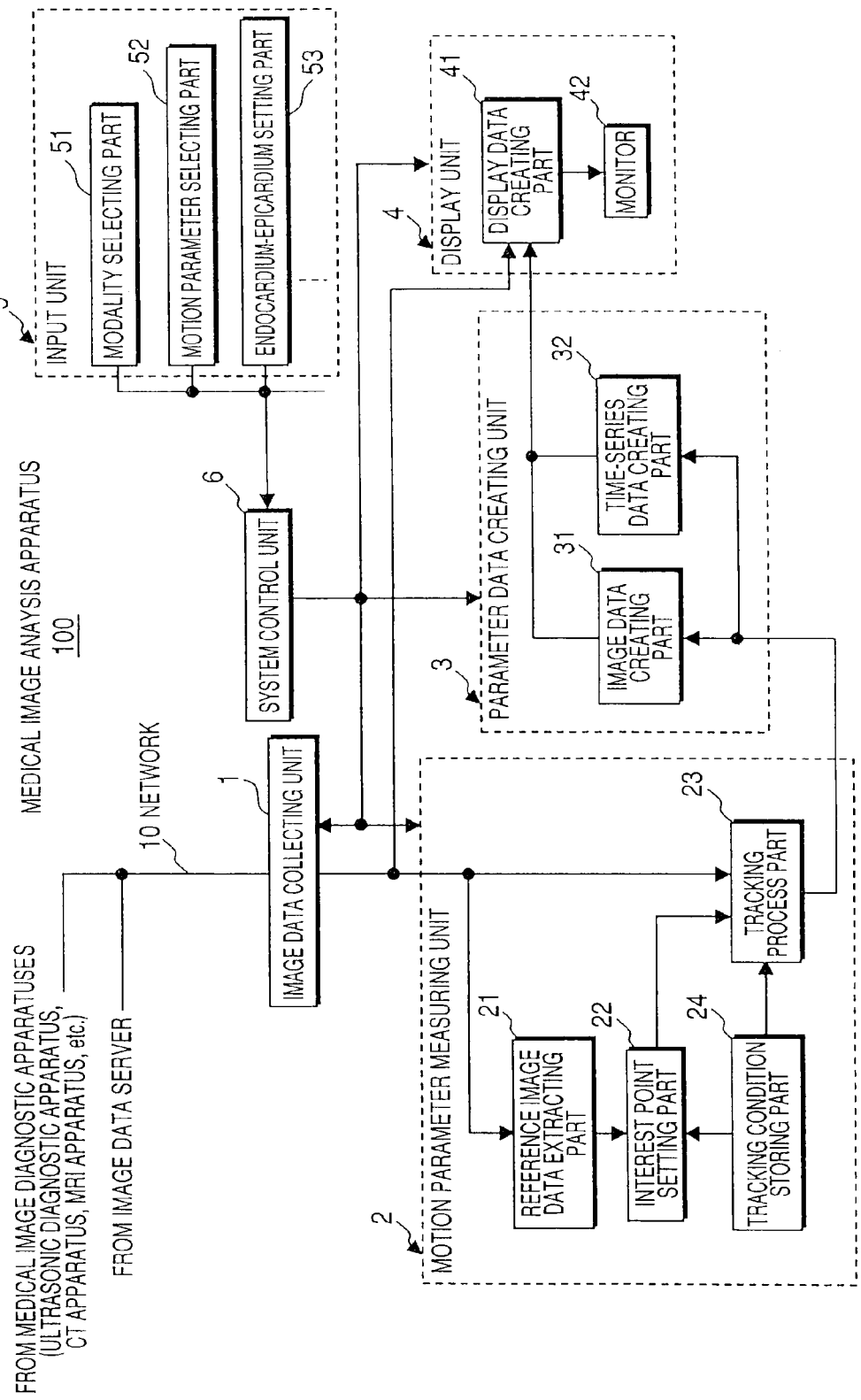
FIG. 1 is a functional block diagram illustrating a medical image analysis apparatus according to an embodiment of the invention.

Hereinafter, an embodiment of the invention will be described with reference to the accompanying drawings.

Embodiment

A medical image analysis apparatus collects subject's time-series image data for a predetermined cardiac cycle supplied from a separate medical image diagnostic apparatus via a network. Subsequently, the medical image analysis apparatus sets a plurality of interest points having a predetermined interval therebetween on a myocardial tissue of a reference image data extracted from a plurality of time-series image data on the basis of a predetermined common analysis algorithm (i.e., an analysis algorithm applicable to image data obtained by a plurality of different medical image diagnostic apparatuses). Subsequently, the medical image analysis apparatus measures a motion parameter such as "strain" on the basis of a displacement amount or a displacement direction of the myocardial tissue at the interest points obtained by a tracking process using the reference image data and a subsequent image data thereof.

Then, the medical image analysis apparatus creates a parameter image data showing a two-dimension distribution of the motion parameter or parameter time-series data showing a variation in time of the motion parameter as parameter data on the basis of the measurement result, and displays the parameter image data or the parameter time-series data on a display unit.

Additionally, in the present embodiment, a case is described in which "strain" of the myocardial tissue is measured as the motion parameter, but the invention is not limited thereto. For example, "displacement", "rotation", "torsion", "speed", or the like of the myocardial tissue may be measured as the motion parameter. Alternatively, "strain rate", "rotation rate", "torsion rate", "acceleration", or the like showing a variation in time may be measured as the motion parameter, or the motion parameter may be measured at biological tissues other than the myocardial tissue.

Then, in the present embodiment, a case is described in which the parameter image data is created from each of the time-series image data for a predetermined cardiac cycle supplied in advance from the medical image diagnostic apparatus, and the obtained parameter image data for a predetermined cardiac cycle overlaps with the image data to be displayed repeatedly (loop display). However, in a case where a process speed upon measuring the motion parameter is faster than a process speed upon collecting the image data, the parameter image data may be created from the image data sequentially supplied from the medical image diagnostic apparatus, and the obtained parameter image data may be displayed in real-time while overlapping with the image data.

(Configuration of Apparatus)

A configuration and a basic operation of the medical image analysis apparatus according to the embodiment of the invention will be described with reference to FIGS. 1 to 6. Additionally, FIG. 1 is a functional block diagram illustrating the medical image analysis apparatus.

A medical image analysis apparatus 100 shown in FIG. 1 includes an image data collecting unit 1 configured to collect time-series image data of a heart for a predetermined cardiac cycle supplied from various medical image diagnostic apparatuses, an image data server, and the like via a network 10, a motion parameter measuring unit 2 configured to measure a motion parameter of a myocardial tissue of a subject on the basis of the time-series image data, a parameter data creating unit 3 configured to create various parameter data on the basis of the measured motion parameter, a display unit 4 configured to display the obtained parameter data, an input unit 5 configured to carry out a selection of a medical image diagnostic apparatus (modality) collecting image data, a selection of a motion parameter, a setting of an endocardium and an epicardium of the reference image data described later, and an input of various command signals, and a system control unit 6 configured to wholly control the above-described units included in the medical image analysis apparatus 100.

The image data collecting unit 1 includes a storing circuit (not shown), and the storing circuit temporarily stores the time-series image data of the heart for a predetermined cardiac cycle supplied from the image data server or the separate medical image diagnostic apparatuses such as an ultrasonic diagnostic apparatus, an X-ray CT apparatus, and an MRI apparatus via the network 10 together with additional information such as cardiac time-phase information. In this case, the storing circuit stores image data created at a time when detecting an R-wave of an electrocardiographic wave shape together with R-wave timing information.

The motion parameter measuring unit 2 includes a reference image data extracting part 21, an interest point setting part 22, a tracking process part 23, and a tracking condition storing part 24. The reference image data extracting part 21 reads out the time-series image data stored in the storing circuit of the image data collecting unit 1. Subsequently, the reference image data 21 obtains reference image data by extracting, for example, the image data having the R-wave timing information from the image data and displays the reference image data on the display unit 4.

The interest point setting part 22 sets interest points having a predetermined interval therebetween on the myocardial tissue surrounded by the endocardium and the epicardium set by the input unit 5 on the reference image data displayed on the display unit 4.

The tracking process part 23 forms a predetermined-size template on the basis of the interest points having a predetermined interval therebetween and set on the myocardial tissue of the reference image data. Then, the tracking process part 23 carries out a tracking process in terms of a pattern matching (template matching) between a plurality of pixels included in the template and pixels of subsequent image data of the reference image data, and measures a local displacement amount and a local displacement direction of the myocardial tissue having the interest points set thereon.

For example, as shown in FIG. 2, the tracking process part 23 extracts reference image data A1 at a time point T1 having the R-wave timing information of an electrocardiographic wave shape Ec from among time-series image data A1 to AM for one cardiac cycle T0 stored in the storing circuit of the image data collecting unit 1. Subsequently, the tracking process part 23 measures a local displacement amount and a local displacement direction of the image data A2 of the myocardial tissue on the basis of the interest point of the reference image data A1 by carrying out a pattern matching between the template formed on the reference image data A1 and the subsequent image data A2 of the reference image data A1 at a time point T2 (T2=T1+δT). Further, the tracking process part 23 measures "the strain" of the myocardial tissue as the motion parameter on the basis of the displacement amount and the displacement direction.

Specifically, the tracking process part 23 forms a two-dimension template, based on the interest points having a predetermined interval therebetween and set on the myocardial tissue of the reference image data A1, on the reference image data A1. Subsequently, the tracking process part 23 relatively moves the template with respect to the subsequent image data A2 of the reference image data A1 so as to carry out a correlation calculation between a plurality of pixels included in the template and pixels of the image data A2. Subsequently, the tracking process part 23 detects a relative movement direction and a relative movement distance of the template capable of obtaining a maximum correlation value with respect to the image data A2 so as to measure a local displacement amount and a local displacement direction of the myocardial tissue based on the interest points. Further, the tracking process part 23 measures "the strain" as a displacement amount by unit length.

When the local "strain" of the myocardial tissue having the interest points set thereon is measured in terms of the pattern matching between the template formed on the reference image data A1 and the image data A2, in the same manner as described above, each local "strain" at a time point T3 (T3=T1+2δT), a time point T4 (T4=T1+3δT), and the like is sequentially measured in terms of the pattern matching using two adjacent image data of the image data A2 and the image data A3, two image data of the image data A3 and the image data A4, and the like.

Additionally, in a case where "the strain" of the myocardial tissue is measured in terms of the pattern matching between the preceding image data and the subsequent image data (for example, the image data A2 and the image data A3), the template of the image data A2 may be set on the basis of position information of the interest points set on the image data A1 by the interest point setting part 22, but may be set on the basis of movement information of the local myocardial tissue measured by the pattern matching between the image data A1 and the image data A2.

Figures 3A, 3B:
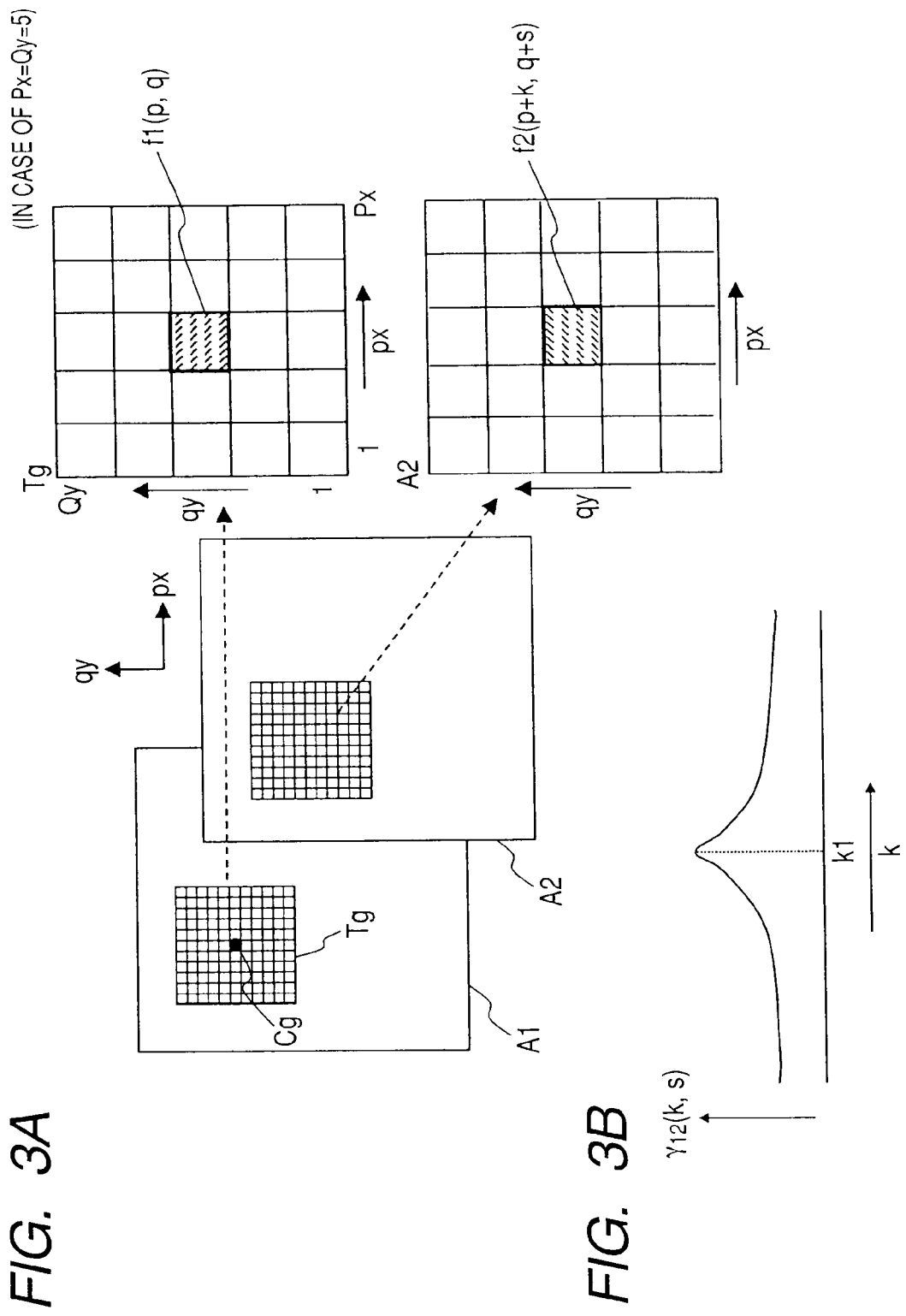
FIGS. 3A and 3B are diagrams illustrating a specific example of a tracking process carried out by a motion parameter measuring unit according to the embodiment.

Next, a tracking process of the image data using the correlation calculation will be described in detail with reference to FIG. 3. An interest point Cg shown in FIG. 3A is one of a plurality of interest points having a predetermined interval therebetween and set on the myocardial tissue of the image data A1. When a pixel value of a template Tg having a predetermined size (i.e., a predetermined number of pixels No (No=Px·Qy)) based on the interest point Cg is denoted by f1 (px, qy) and a pixel value of the image data A2 is denoted by f2 (px, qy), it is possible to measure the displacement amount and the displacement direction of the cardiac muscle having the interest point Cg set thereon after a time δt by calculating a correlation coefficient γ12 (k, s) in terms of the following equation (1).

$$\gamma_{12}(k, s) = \tag{1}$$

$$\frac{1}{No\sigma_1\sigma_2} \sum_{Px=1}^{Px} \sum_{qy=1}^{Qy} (f1(px, qy) - \overline{f1})(f2(px+k, qy+s) - \overline{f2})$$

-continued $$\overline{f1} = \frac{1}{No} \sum_{Px=1}^{Px} \sum_{qy=1}^{Qy} f1(px, qy)$$

$$\overline{f2} = \frac{1}{No} \sum_{Px=1}^{Px} \sum_{qy=1}^{Qy} f2(px+k, qy+s)$$

$$\sigma_1^2 = \frac{1}{No} \sum_{Px=1}^{Px} \sum_{qy=1}^{Qy} (f1(px, qy) - \overline{f1})^2$$

$$\sigma_2^2 = \frac{1}{No} \sum_{Px=1}^{Px} \sum_{qy=1}^{Qy} (f2(px, qy) - \overline{f2})^2$$

$$No = PxQy$$

Here, Px and Qy denote number of pixels in a px direction and a qy direction of the template Tq, respectively, and in general, the interest point Cg set on the myocardial tissue of the image data A1 is substantially located at the center of the template Tq.

When k=k1 (see FIG. 3B), s=s1 (not shown), and γ12 (k, s) has a maximum value as a result of the correlation calculation, the correlation calculation result shows that the local myocardial tissue having the interest point Cg thereon of the image data A1 is displaced by k1 pixel in a px direction and by s1 pixel in a qy direction in the image data A2.

Such a tracking process is performed on all interest points set on the cardiac muscle of the image data A1, and a local displacement amount and a local displacement direction of the myocardial tissue having the interest points set thereon of the image data A1 after a time δT are measured. Subsequently, "the strain" defined as a displacement amount by unit length is measured as the motion parameter on the basis of the displacement amount and the displacement direction measured in two dimensions.

Subsequently, in the same sequence, the same tracking process is performed on the subsequent image data A3 to AM of the image data A2, and the local "strain" of the myocardial tissue of the image data is measured.

As shown in FIG. 1, the tracking condition storing part 24 of the motion parameter measuring unit 2 stores a tracking condition such as a smoothing process, a gain, a dynamic range, an observation region, and a template size used in the pattern matching between the image data by the tracking process part 23 or an interval between the interest points set on the myocardial tissue of the reference image data A1 by the interest point setting part 22 for each modality.

Then, the parameter creating unit 3 includes an image data creating part 31 and a time-series data creating part 32.

The image data creating part 31 creates parameter image data by arranging the motion parameters measured from the myocardial tissue of the image data having a plurality of interest points set thereon by the tracking process part 23 of the motion parameter measuring unit 2 so as to correspond to position information of the interest points. Then, in terms of the above-described method, the image data creating unit 31 sequentially creates parameter image data corresponding to each time-series image data for a predetermined cardiac cycle supplied from the image data collecting unit 1, and supplies the cardiac time-phase information as additional information added to the image data to the display unit 4.

Figure 4:
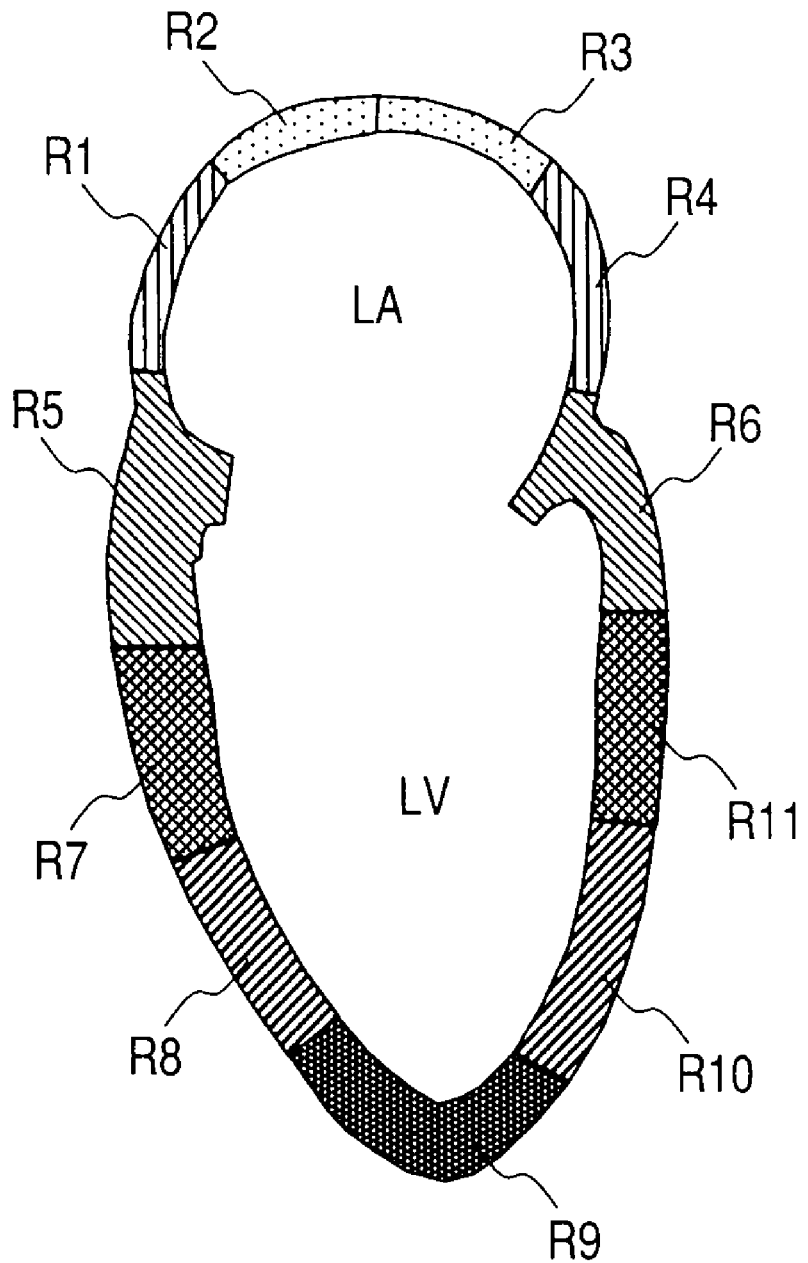
FIG. 4 is a diagram illustrating a specific example of parameter image data created by a parameter data creating unit according to the embodiment.

FIG. 4 shows a specific example of the parameter image data created by the image data creating unit 31, which is parameter image data obtained when image data of a section including a left atrium LA and a left ventricle LV of a subject is created by the medical image diagnostic apparatus. Additionally, parameter image data may be created just by using the motion parameter at the interest point of the image data measured by performing the tracking process of the myocardial tissue at the interest point of the reference image data, but as shown in FIG. 4, parameter image data suitable for a diagnosis may be created by using an average value of the motion parameter (average motion parameter) measured at a plurality of interest points included in measurement regions R1 to R11 set in advance along the myocardial tissue.

That is, in FIG. 4, for example, the measurement regions R1 to R4 are set on the myocardial tissue of the left atrium LA, the measurement regions R7 to R11 are set on the myocardial tissue of the left ventricle LV, and then the measurement regions R5 and P6 are set on the boundary between the left atrium LA and the left ventricle LV. On the basis of the average value of the motion parameters measured at a plurality of interest points included in the respective measurement regions, a luminance, a color tone, and the like are set.

Meanwhile, the time-series data creating part 32 of the parameter data creating unit 3 shown in FIG. 1 creates parameter time-series data showing a variation in time of the average motion parameter or the motion parameter by arranging the average motion parameter at a desired measurement region or a local motion parameter at a desired portion, measured by the tracking process part 23 from the myocardial tissue of the time-series image data for a predetermined cardiac cycle supplied from the image data collecting unit 1, in a time-axis direction, and supplies the obtained parameter time-series data for a predetermined cardiac cycle to the display unit 4.

Figure 5:
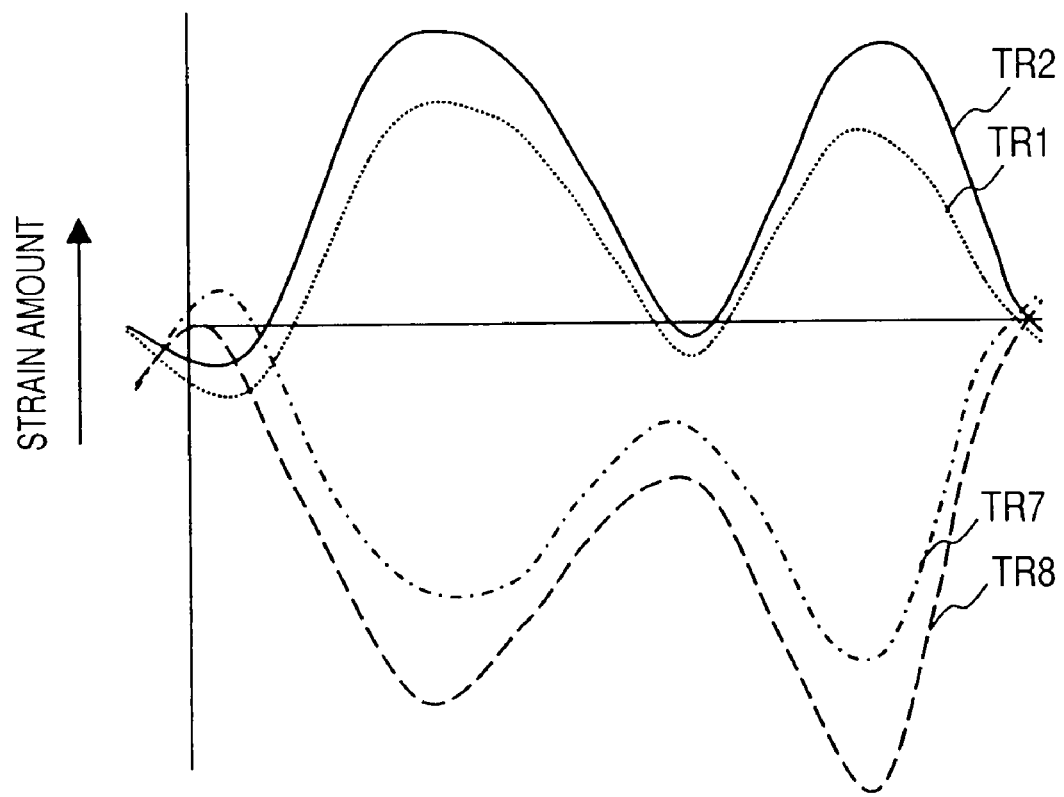
FIG. 5 is a diagram illustrating a specific example of parameter time-series data created by the parameter data creating unit according to the embodiment.

FIG. 5 shows a specific example of the parameter time-series data created by the time-series data creating part 32. In the parameter time-series data created together with the parameter image data shown in FIG. 4, for example, variations TR1 and TR2 in time of the average motion parameter measured at the predetermined measurement regions R1 and R2 of the left atrium LA and variations TR7 and TR8 in time of the average motion parameter measured at the predetermined measurement regions R7 and R8 of the left ventricle LV are depicted for one cardiac cycle.

As shown in FIG. 1, the display unit 4 includes a display data creating part 41 and a monitor 42. The display data creating part 41 creates display data by overlapping or combining the parameter image data and the parameter time-series data supplied from the parameter data creating unit 3 with the image data supplied from the image data collecting unit 1 to be converted into a predetermined display format, and displays the display data on the monitor 42. In this case, the parameter image data is displayed on the basis of the color tone and the luminance corresponding to the average motion parameter or the motion parameter described above.

That is, the display data creating part 41 receives the time-series parameter image data supplied from the image data creating part 31 of the parameter data creating unit 3 and the parameter time-series data supplied from the time-series data creating part 32, and reads out the image data having the same cardiac time-phase information as that of each parameter image data from the storing circuit of the image data collecting unit 1. Then, the display data creating part 41 combines the parameter time-series data with the parameter image data overlapping with the image data.

Figure 6:
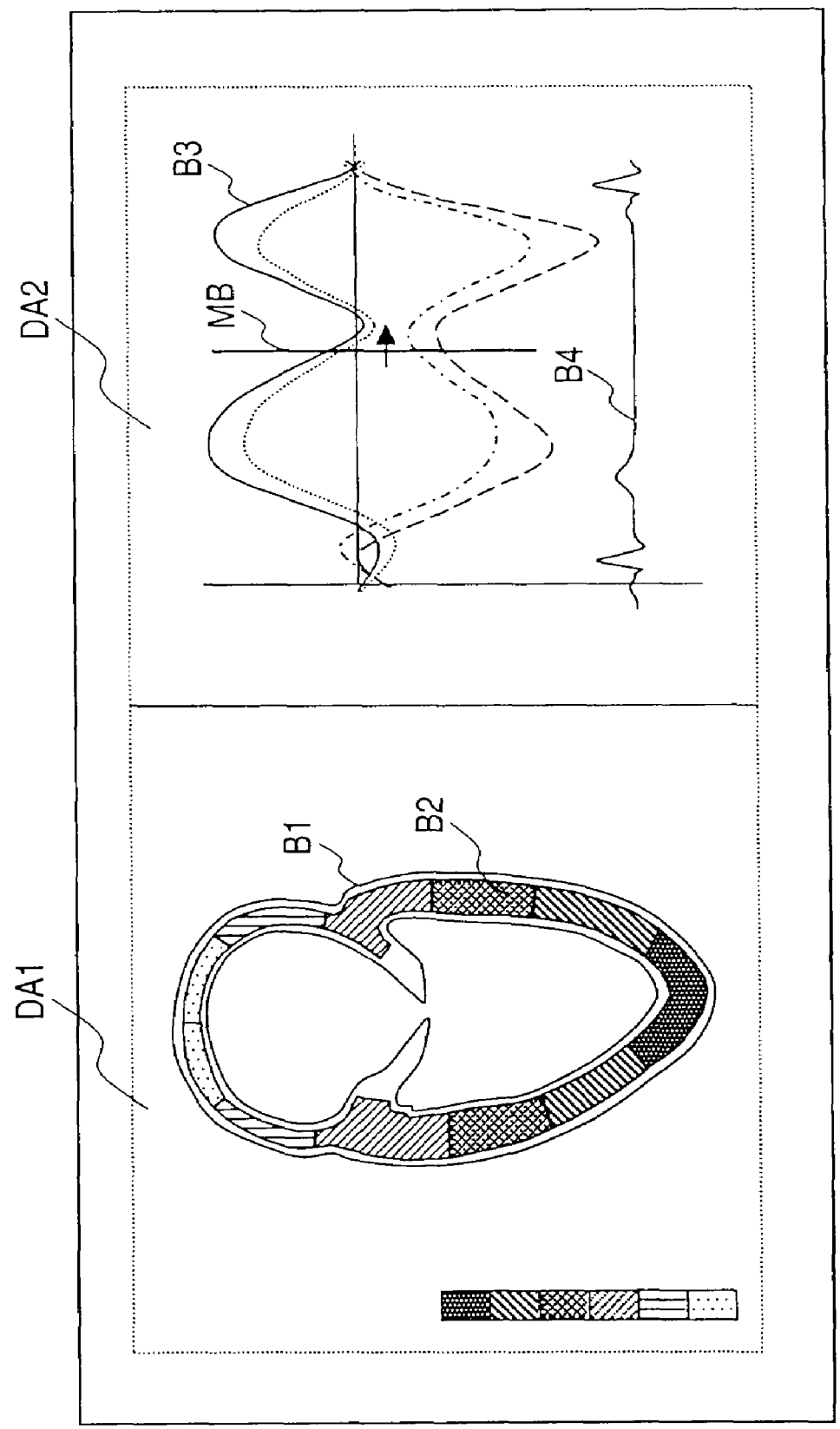
FIG. 6 is a diagram illustrating a specific example of display data displayed on a display unit according to the embodiment.

FIG. 6 shows a specific example of the display data displayed on the monitor 42 of the display unit 4. The display data includes, for example, an image data display region DA1 and a time-series data display region DA2. In the image data display region DA1, parameter image data B2 overlapping with image data B1 at the same cardiac time phase is displayed. In the time-series data display region DA2, parameter time-series data B3 created on the basis of the time-series image data for a predetermined cardiac cycle and an electro-cardiographic wave shape B4 based on the cardiac time-phase information added to the image data are displayed, repectively. In this case, a moving bar MB showing the cardiac time phase of the image data B1 and the parameter image data B2 disposed on the image data display region DA1 is set with respect to the parameter time-series data B3.

For example, in a case where the image data for one cardiac cycle collected from the subject is repeatedly supplied from the image data collecting unit 1, in the image data display region DA1, the parameter time-series data B2 created on the basis of the image data is repeatedly displayed together with the image data in a form of a moving picture (loop display). At this time, the moving bar MB showing the cardiac time phase of the image data B1 and the parameter image data B2 displayed on the image data display region DA1 moves in a direction indicated by the arrow along a time axis of the parameter time-series data B3 in the time-series data display region DA2.

Next, the input unit 5 shown in FIG. 1 includes a display panel or an input device such as an input button, a selection button, a mouse, a track ball, a keyboard provided in an operation panel. Also, the input unit 5 includes a modality selecting part 51 configured to select a medical image diagnostic apparatus (modality) creating desired image data, a motion parameter selecting part 52 configured to select motion parameter, and an endocardium-epicardium setting part 53 configured to set an endocardium and an epicardium on the reference image data. Additionally, the input unit 5 carries out an input of various command signals, a setting of a parameter data display condition, a setting of a parameter data creating condition, a setting of an image data collection condition, and an input of subject information by the use of the display panel or the input device described above.

Additionally, an example of the modality includes an ultrasonic diagnostic apparatus, an X-ray CT apparatus, an MRI apparatus, an X-ray diagnostic apparatus, and an endoscope apparatus. An example of the motion parameter includes "the displacement", "the rotation", "the torsion", "the speed", "the strain rate", "the rotation rate", "the torsion rate", and "the acceleration" in addition to "the strain" described above.

Next, the system control unit 6 includes a CPU (not shown) and a storing circuit, and the information input, set, or selected by the input unit 5 is stored in the storing circuit. Then, the CPU wholly controls the respective units of the medical image analysis apparatus 100 on the basis of the information stored in advance in its storing circuit or the above-described information input from the input unit 5, and creates and displays the parameter image data and the parameter time-series data.

(Sequence of Creating and Displaying Parameter Data)

Figure 7:
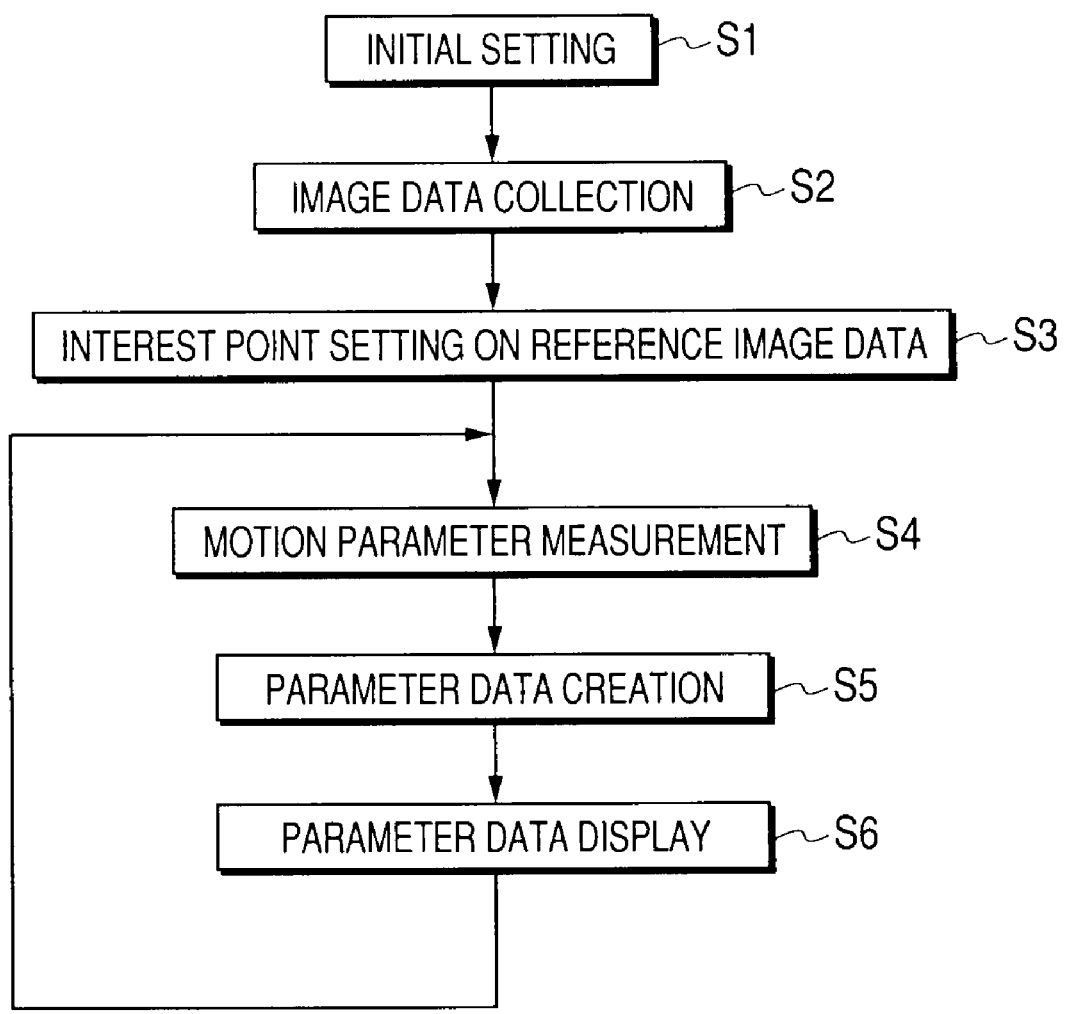
FIG. 7 is a flowchart illustrating a sequence of creating and displaying parameter data according to the embodiment.

Next, a sequence of creating and displaying the parameter image data and the parameter time-series data according to the present embodiment will be described with reference to a flowchart shown in FIG. 7.

Before creating the parameter data, an operator of the medical image analysis apparatus 100 inputs the subject information using the input unit 5, and selects, for example, "the X-ray CT apparatus" as the modality for collecting the image data and "the strain" of the myocardial tissue as the motion parameter. Subsequently, the operator sets the image data collection condition, the parameter data creating condition, and the display condition of the parameter data or the image data by the use of the input unit 5. Subsequently, when the above-described initial setting is completed, the operator inputs the image data collection command by the use of the input unit 5 (Step S1 of FIG. 7).

When the image data collecting unit 1 receives the subject information, the modality selection information, the image data collection condition information, and the image data collection start command from the input unit 5 via the system control unit 6, the image data collecting unit 1 transmits a command signal based on the above-described information to the X-ray CT apparatus connected via the network 10. Subsequently, the storing circuit of the image data collecting unit 1 temporarily stores the time-series image data (CT image data) for a predetermined cardiac cycle of the subject together with the cardiac time-phase information as addition information supplied from the X-ray CT apparatus in accordance with the command signal (Step S2 of FIG. 7).

After the collection and the storage of the image data is completed, the operator inputs a parameter data creation start command by the use of the input unit 5. When the reference image data extracting part 21 of the motion parameter measuring unit 2 receives the command signal via the system control unit 6, the reference image data extracting part 21 extracts the image data having the R-wave timing information as the reference image data from among the time-series image data stored in the storing circuit of the image data collecting unit 1, and displays the reference image data on the monitor 42 of the display unit 4.

When the operator observes the reference image data displayed on the display unit 4, the operator sets the endocardium and the epicardium on the myocardial tissue of the reference image data by the use of the endocardium-epicardium setting part 53 of the input unit 5. Subsequently, the interest point setting part 22 of the motion parameter measuring unit 2 reads out the tracking condition of the X-ray CT apparatus stored in advance in the tracking condition storing part 24, and sets a plurality of interest points having a predetermined interval therebetween on the myocardial tissue of the reference image data surrounded by the endocardium and the epicardium on the basis of the tracking condition (Step S3 of FIG. 7).

Meanwhile, the tracking process part 23 reads out the time-series image data for a predetermined cardiac cycle stored in the storing circuit of the image data collecting unit 1 and the tracking condition of the X-ray CT apparatus stored in advance in the tracking condition storing part 24. Subsequently, the tracking process part 23 sets a predetermined-size template based on the interest points on the reference image data included in the image data on the basis of the tracking condition. Subsequently, the tracking process part 23 measures the local "displacement" of the myocardial tissue by performing a pattern matching between a plurality of pixels included in the template and the pixels of the subsequent image data of the reference image data, and measures "the strain" defined as the displacement by unit length as the motion parameter (Step S4 of FIG. 7).

Subsequently, the image data creating part 31 of the parameter data creating unit 3 creates the two-dimension parameter image data by arranging the motion parameter measured from each time-series image data by the tracking part 23 of the motion parameter measuring unit 2 so as to correspond to the position information of the interest point. The time-series data creating part 32 creates the parameter time-series data showing a variation in time of the average motion parameter or the motion parameter by sequentially arranging the local motion parameter at the desired portion measured from the myocardial tissue of the image data by the tracking process part 23 or the average motion parameter at the desired region based on the motion parameter in a time-axis direction (Step S5 of FIG. 7).

Subsequently, the parameter image data and the parameter time-series data created from the image data for a predetermined cardiac cycle is supplied to the display unit 4. At this time, each parameter image data supplies the cardiac time-phase information as the additional information added to the image data corresponding to the parameter image data to the display unit 4.

Subsequently, the display data creating part 41 of the display unit 4 receives the time-series parameter image data supplied from the image data creating part 31 of the parameter data creating unit 3 and the parameter time-series data supplied from the time-series data creating part 32, and reads out the image data having the same cardiac time-phase information as that of each parameter image data from the storing circuit of the image data collecting unit 1. Subsequently, the display data creating part 41 creates the display data by adding the parameter time-series data to the parameter image data overlapping with the image data, and displays the display data on the monitor 42 (see FIG. 6) (Step S6 of FIG. 7).

When the creation and the display of the parameter data of the image data for a predetermined cardiac cycle stored in the storing circuit of the image data collecting unit 1 is completed in accordance with the above-described sequence, the motion parameter measuring unit 2 measures the motion parameter by repeatedly reading out the time-series image data for a predetermined cardiac cycle on the basis of the control signal supplied from the system control unit 6. The parameter data creating unit 3 creates the parameter image data and the parameter time-series data on the basis of the motion parameter measured by the motion parameter measuring unit 2, and displays the parameter image data and the parameter time-series data on the display unit 4. That is, the display unit 4 repeatedly displays the parameter time-series data and the parameter image data corresponding to the image data for a predetermined cardiac cycle (loop display) (Steps S4 to S6 of FIG. 7).

According to the above-described embodiment, since the desired motion parameter is measured by applying a predetermined common analysis algorithm to the time-series image data of the biological tissue created by the different medical image diagnostic apparatuses, it is possible to efficiently evaluate the motion function of the biological tissue. For this reason, it is possible to improve diagnostic efficiency and diagnostic precision and to reduce a burden of the operator.

Particularly, it is difficult to obtain the parameter data of the four-chamber section or two-chamber section of the heart from the ultrasonic image data because a propagation of the ultrasonic wave is disturbed by a rib or a lung, but in a case where the parameter data is created on the basis of the CT image data, it is possible to easily create parameter data of four-chamber section or two-chamber section of the heart.

Additionally, according to the above-described embodiment, since the average value of a plurality of motion parameters (average motion parameter) measured at a plurality of interest points in the measurement region set along the myocardial tissue is used, it is possible to restrict a variation caused by noise or the like and to create the parameter image data suitable for the diagnosis. Then, since the parameter image data is displayed while overlapping with the image data, it is possible to make clear the parameter data creation region throughout the whole region of the heart.

While the above-described embodiment has been described, the invention is not limited to the above-described embodiment, but may be modified into various forms. For example, in the above-described embodiment, a case has been described in which various parameter data are created by analyzing the image data created by different medical image diagnostic apparatuses in terms of the common medical image analysis apparatus 100 having the common analysis algorithm, but the parameter data may be created by applying the common analysis algorithm to a private-use medical image analysis apparatus corresponding to the medical image diagnostic apparatus.

Additionally, in the above-described embodiment, a case has been described in which the time-series parameter image data created on the basis of the image data for a predetermined cardiac cycle repeatedly supplied from the storing circuit of the image data collecting unit 1 is displayed in loop on the display unit 4. However, a parameter data storing unit may be provided which stores the parameter data created on the basis of the image data for a predetermined cardiac cycle, and the parameter image data stored in the parameter data storing unit may be repeatedly read out to be displayed in loop.

Then, in a case where a process speed upon measuring the motion parameter is faster than a process speed upon collecting the image data, the parameter data may be created from the image data sequentially supplied from the medical image diagnostic apparatus, and the obtained parameter data may be displayed in real-time. In this case, it is not necessarily needed to provide the storing circuit included in the image data collecting unit 1 shown in FIG. 1 or the above-described parameter data storing unit.

Meanwhile, in the above-described embodiment, a case has been described in which the tracking process of the time-series image data is carried out on the basis of the tracking condition stored in the tracking condition storing part 24 of the motion parameter measuring unit 2, but the invention is not limited thereto. For example, the tracking condition suitable for the tracking process of the image data may be directly set by the input unit 5.

Additionally, a case has been described in which the two-dimension parameter image data is created on the basis of the two-dimension image data supplied from the medical image diagnostic apparatus, but the two-dimension or three-dimension parameter image data may be created on the basis of the three-dimension image data. Further, a case has been described in which the interest points are set on the image data, having the R-wave timing information, as the reference image data, but the image data obtained at an arbitrary cardiac time phase may be used as the reference image data.

Then, in the above-described embodiment, a case has been described in which "the strain" of the myocardial tissue is measured as the motion parameter, but the invention is not limited thereto. For example, "the displacement", "the rotation", "the torsion", "the speed", or the like may be measured as the motion parameter. Also, "the strain rate", "the rotation rate", "the torsion rate", "the acceleration", or the like showing a variation in time of "the displacement", "the rotation", "the torsion", "the speed", or the like may be used as the motion parameter. The above-described motion parameter may be measured at biological tissues other than the myocardial tissue.

Further, a case has been described in which the parameter image data, the parameter time-series data, and the image data are displayed while overlapping or combining with one another, but these data may be displayed independently. A case has been described in which the time-series image data created by the medical image diagnostic apparatus is collected via the network 10, but the time-series image data may be collected via a storing medium. That is, the collection method is not particularly limited.

Furthermore, the parameter data creation or the tracking process carried out by the respective parts of the parameter data creating unit 3 and the motion parameter measuring unit 2 shown in FIG. 1 may be carried out by hardware, but all or a part of the parameter creation or the tracking process is carried out by software based on the common analysis algorithm in general.

What is claimed is:

1. A medical image analysis apparatus, comprising:
   an image data collecting unit configured to collect time-series image data created by each of different medical image diagnostic apparatuses;
   a tracking condition storing unit configured to store respective tracking conditions corresponding to the different medical image diagnostic apparatuses;
   a motion parameter measuring unit configured to measure a motion parameter of a biological tissue by processing the time-series image data;
   a parameter data creating unit configured to create parameter data based on the motion parameter; and
   a display configured to display the parameter data,
   wherein the motion parameter measuring unit measures the motion parameter by tracking the time-series image data based on the respective tracking conditions corresponding to the different medical image diagnostic apparatuses, the tracking conditions including at least one of a template size, an observation region, a dynamic range, a gain, and a smoothing process, and by analyzing the image data created by the different medical image diagnostic apparatuses by the use of a common analysis algorithm.

2. The medical image analysis apparatus according to claim 1, wherein the motion parameter measuring unit is configured to measure the motion parameter by tracking the time-series image data created by each of the different medical image diagnostic apparatuses.

3. The medical image analysis apparatus according to claim 2,
   wherein the motion parameter measuring unit is configured to read out the tracking condition corresponding to each of the medical image diagnostic apparatus creating the time-series image data from the tracking condition storing unit, and to track the image data based on the corresponding tracking condition.

4. The medical image analysis apparatus according to claim 2, further comprising:
   a modality selecting part configured to select one of the medical image diagnostic apparatuses creating the time-series image data,
   wherein the motion parameter measuring unit is configured to track the image data by the use of the tracking condition corresponding to the one medical image diagnostic apparatus read out from the tracking condition storing unit based on the modality selection information supplied from the modality selecting part.

5. The medical image analysis apparatus according to claim 2, further comprising:
   a tracking condition input unit configured to input the tracking condition corresponding to each of the medical image diagnostic apparatuses,
   wherein the motion parameter measuring unit tracks the image data based on the tracking condition input by the tracking condition input unit.

6. The medical image analysis apparatus according to claim 1, wherein the parameter data creating unit includes an image data creating part configured to create two-dimensional or three-dimensional parameter image data based on the motion parameter measured by the motion parameter measuring unit.

7. The medical image analysis apparatus according to claim 1, wherein the parameter data creating unit includes a time-series data creating part configured to create parameter time-series data showing a variation in time of the motion parameter measured by the motion parameter measuring unit.

8. The medical image analysis apparatus according to claim 1, wherein the display is configured to display in real time parameter image data created based on the time-series image data.

9. The medical image analysis apparatus according to claim 6, wherein the display is configured to display in a loop the parameter image data for a predetermined cardiac cycle created based on the time-series image data.

10. The medical image analysis apparatus according to claim 8 or 9, wherein the display is configured to overlap or combine the parameter image data with the image data to be displayed in synchronization.

11. An image analysis control method executed by a medical image analysis apparatus, the method comprising:
    collecting time-series image data created by each of different medical image diagnostic apparatuses;
    storing respective tracking conditions corresponding to the different medical image diagnostic apparatuses;
    measuring a motion parameter of a biological tissue by processing the time-series image data;
    creating parameter data based on the motion parameter; and
    displaying the parameter data,
    wherein the measuring step includes measuring the motion parameter by tracking the time-series image data based on the respective tracking conditions corresponding to the different medical image diagnostic apparatuses, the tracking conditions including at least one of a template size, an observation region, a dynamic range, a gain, and a smoothing process, and analyzing, by use of a common analysis algorithm, the image data created by the different medical image diagnostic apparatuses.

12. The medical image analysis apparatus according to claim 1, wherein the different medical image diagnostic apparatuses includes at least two of an ultrasonic diagnostic apparatus, an X-ray CT apparatus, an X-ray diagnostic apparatus, and an MRI apparatus.

* * * * *